J. P. BELLINGER.
CURD MILL.
No. 185,012. Patented Dec. 5, 1876.
Fig. 1.
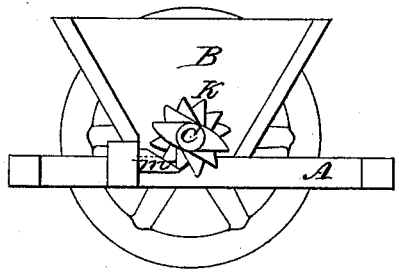
Fig. 2.    Fig. 3.
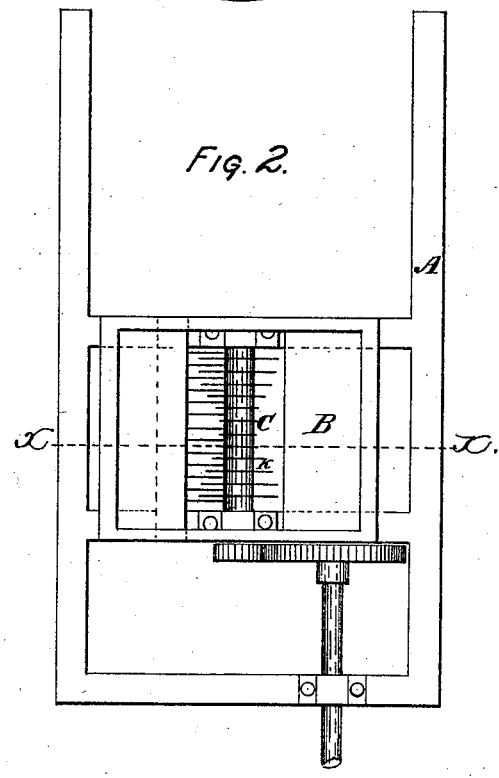
WITNESSES.    INVENTOR

UNITED STATES PATENT OFFICE.

JACOB P. BELLINGER, OF ST. JOHNSVILLE, ASSIGNOR TO R. S. & W. W. WHITMAN AND D. H. BURRILL, OF LITTLE FALLS, NEW YORK.

IMPROVEMENT IN CURD-MILLS.

Specification forming part of Letters Patent No. 185,012, dated December 5, 1876; application filed April 26, 1876.

*To all whom it may concern:*

Be it known that I, JACOB P. BELLINGER, of St. Johnsville, in the county of Montgomery, State of New York, have invented an Improved Curd-Mill, of which the following is a specification:

Heretofore curd-mills, previous to my invention, have been made to crush and break up the curd, in consequence of which the butter and white whey are released by the breaking of the cells containing them, greatly to the detriment of the manufactured cheese; besides which it takes a very considerable power to thus grind the curd in excess of that required by mine.

My improved mill obviates and avoids the objections to the former mills, and works with less power.

The construction is as follows, referring to the figures on the accompanying drawings, in which Figure 1 is a vertical section on line $xx$, Fig. 2. Fig. 2 is a top plan; Fig. 3, a cylinder-knife, detached.

A is a supporting-frame; B, the hopper, to hold the curd. C is a revolving cylinder. So far my devices are like those previously used; but instead of pegs or radial pins projecting from the cylinder and passing through a grating of thick ribs, as used in the old mills, I employ thin knives $k$, radiating from the cylinder on both sides, and set in a spiral line, so as to present two points of contact with the stationary knives $m$, between which they pass as they revolve. One of the knives on the cylinder is shown detached in Fig. 3. The stationary knives $m$ are affixed to the frame, and extend out nearly to the center of the cylinder.

By this form and arrangement of the knives the curd is properly cut and subdivided without clogging or displacement in the hopper, and it is freely delivered from the knives below, cut into thin slices without breaking or destroying the cells above named, thus preventing the discharge of their contents, and the thin cutting-knives pass through the curd with the least possible resistance, subdividing it with much less expenditure of power than the previous machines required, as before stated. These improvements render the process cheaper and vastly superior to the old method, as has been thoroughly tested practically.

Having thus fully described my invention, I claim—

The curd-mill, constructed and arranged as herein set forth, having cutting-knives affixed spirally around a horizontal cylinder located at the bottom of a hopper and filling the whole space of the outlet, with stationary knives projecting out from one side of the outlet to the cylinder, as herein described, as and for the purposes specified.

In witness whereof I have hereto set my hand this 11th day of April, 1876.

JACOB P. BELLINGER.

In presence of—
H. BUCHANAN,
C. VAN VECHTER.